(12) United States Patent
Park et al.

(10) Patent No.: US 9,417,456 B2
(45) Date of Patent: Aug. 16, 2016

(54) THREE DIMENSIONAL DISPLAY DEVICE AND MANUFACTURING METHOD FOR THE SAME

(71) Applicants: SAMSUNG ELECTRONICS CO., LTD., Suwon-si (KR); SAMSUNG DISPLAY CO., LTD., Yongin-si (KR)

(72) Inventors: Jae Hyun Park, Seoul (KR); Il Joo Kim, Hwaseong-si (KR); Sung Woo Lee, Anyang-si (KR)

(73) Assignees: SAMSUNG ELECTRONICS CO., LTD., Suwon-si (KR); Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/577,382

(22) Filed: Dec. 19, 2014

(65) Prior Publication Data

US 2015/0177528 A1 Jun. 25, 2015

(30) Foreign Application Priority Data

Dec. 19, 2013 (KR) ........................ 10-2013-0159534

(51) Int. Cl.
*G02B 27/22* (2006.01)
*G02F 1/1333* (2006.01)
*G02F 1/1347* (2006.01)
*H04N 13/04* (2006.01)
*G02F 1/1335* (2006.01)
*G02B 5/02* (2006.01)

(52) U.S. Cl.
CPC .......... *G02B 27/2278* (2013.01); *G02B 27/225* (2013.01); *G02F 1/1347* (2013.01); *G02F 1/133308* (2013.01); *G02F 1/133608* (2013.01); *H04N 13/0402* (2013.01); *H04N 13/0495* (2013.01); *G02B 5/0278* (2013.01); *G02F 2001/133325* (2013.01); *H04N 2213/001* (2013.01); *Y10T 29/49002* (2015.01)

(58) Field of Classification Search
CPC ............... G02B 27/22; G02B 27/2274; G02B 27/2278; G02B 5/0278; G02B 27/225; G02F 1/1347; G02F 1/133308; G02F 1/133608; G02F 1/1335; G02F 1/1333; H04N 13/0402; H04N 2213/001; Y10T 29/49002
USPC ....................................... 359/478; 349/58, 15
See application file for complete search history.

(56) References Cited

U.S. PATENT DOCUMENTS

2005/0146787 A1 7/2005 Lukyanitsa
2009/0091667 A1\* 4/2009 Schultz .............. G02B 27/2214
349/15
2009/0174827 A1 7/2009 Kim et al.
(Continued)

FOREIGN PATENT DOCUMENTS

EP 1607788 A1 12/2005
KR 10-2012-0123824 A 11/2012
WO 2012/157376 A1 11/2012

OTHER PUBLICATIONS

Lanman, et al.; "HR3D: Glasses-Free 3D Display using Dual-Stacked LCDs", ACM Transactions on Graphics, vol. 29, No. 6, Dec. 2010.
(Continued)

*Primary Examiner* — Euncha Cherry
(74) *Attorney, Agent, or Firm* — Sughrue Mion, PLLC (57) ABSTRACT

A three dimensional (3D) display device and manufacturing method for the same are provided. The 3D display device includes a 3D display module; a back light module disposed behind the 3D display module; and a main frame. The back light module is installed inside of a rear side of the main frame, and the 3D display module is installed inside of a front side of the main frame.

11 Claims, 6 Drawing Sheets

(56) References Cited

U.S. PATENT DOCUMENTS

2009/0316064 A1* 12/2009 Kono ............... G02F 1/133615
            349/58
2012/0013818 A1    1/2012 Park et al.

OTHER PUBLICATIONS

Communication dated Apr. 8, 2015, issued by the European Patent Office in counterpart European Application No. 14197129.1.

* cited by examiner

THREE DIMENSIONAL DISPLAY DEVICE AND MANUFACTURING METHOD FOR THE SAME

CROSS-REFERENCE TO RELATED APPLICATION(S)

This application claims priority under 35 U.S.C. §119(a) to Korean patent application Serial No. 10-2013-0159534, filed on Dec. 19, 2013 in the Korean Intellectual Property Office, the entire disclosure of which is incorporated herein by reference.

TECHNICAL FIELD

Apparatuses and methods consistent with exemplary embodiments relate to a three dimensional (3D) display device and manufacturing method for the 3D display device for displaying 3D images.

BACKGROUND

Three dimensional (3D) display devices commonly include a display panel which displays an image.

One type of 3D display device includes a first display panel which displays a first image and a second display panel which displays a second image, where the second image is an image of the same scene, but from a point of view different from that of the first image. The first and second display panels are arranged one behind the other so that the user can simultaneously view the first and second images, having different points of view, thereby enabling the user to view a 3D image without the user of glasses.

SUMMARY

One or more exemplary embodiments may provide a three dimensional (3D) display device to which a back light module, used in ordinary display devices, may be applied.

In accordance with an aspect of an exemplary embodiment, a three dimensional (3D) display device is provided. The 3D display device includes a 3D display module; a back light module arranged behind the 3D display module, for supplying light to the 3D display module; and a main frame, wherein the back light module is installed inside of a rear side of the main frame and the 3D display module is installed inside of a front side of the main frame. The 3D display module includes: a first display panel for displaying a two dimensional (2D) image, a second display panel, arranged apart from and in front of the first display panel, for displaying a 3D image, and a spacing panel between the first display panel and the second display panel. The first display panel is affixed to a rear side of the spacing panel, and the second display panel is affixed to a front side of the spacing panel.

The back light module may include a light source, a diffuser plate arranged in front of the light source, a back light frame for supporting the light source and the diffuser plate, a supporting bracket installed on the back light frame for supporting outer edges of the diffuser plate and to hold the diffuser plate to the back light frame, and a rear chassis for covering the rear side of the back light frame.

The main frame may have a substantially rectangular shape, as viewed from the front, such that is loops around outer edges of the back light module and the display module.

The main frame may include a projecting part that extends inward from inside of a rear side edge of the main frame to catch and support the back light module, and a receiving groove formed inside a front side edge for receiving and supporting outer edges of the 3D display module.

The outer edges of the spacing panel may extend from between the first and second display panels, and the extended outer edges of the spacing panel may be received within the receiving groove.

The back light module may include an installation bracket installed on the outer side of the back light module, wherein the installation bracket is configured to abut against the projecting part of the main frame when the back light module is installed within the main frame.

The 3D display device may further include a case installed around the main frame for forming an exterior of the 3D display device, wherein the case includes a bezel part to cover the outer side of the 3D display module and a side part to cover the sides of the main frame.

In accordance with an aspect of another exemplary embodiment, a manufacturing method for a three dimensional (3D) display device is provided. The method includes preparing a 3D display module; preparing a back light module; preparing a main frame; preparing a case; installing the back light module within an inside of a rear side of the main frame; installing the 3D display module within an inside of a front side of the main frame; and installing the case on the main frame.

Preparing the 3D display module may include providing a first panel affixed to a rear side of a spacing panel and a second panel affixed to a front side of the spacing panel.

Installing the back light module may include inserting the back light module into the main frame until an installation bracket, installed on an outer side of the back light module, abuts against a projecting part projecting inward from the inside of the rear side of the main frame.

Installing the 3D display module may include inserting the 3D display module into the main frame until outer edges of the spacing panel that extend from between the first and second display panels abut against a receiving groove arranged inside of the front side of the main frame.

Other exemplary aspects, advantages, and salient features will become apparent to those skilled in the art from the following detailed description, which, taken in conjunction with the annexed drawings.

BRIEF DESCRIPTION OF THE DRAWINGS

The above and/or other exemplary features and advantages will become more apparent from the following description of exemplary embodiments with reference to the attached drawings in which.

Throughout the drawings, like reference numerals will be understood to refer to like parts, components, and structures.

DETAILED DESCRIPTION

Exemplary embodiments will now be described more fully with reference to the accompanying drawings. The exemplary embodiments should not be construed as limited to specific structures and features set forth herein; rather, these embodiments are provided so that this disclosure will be thorough and complete, and will fully convey the concept of the disclosure to those skilled in the art. Like reference numerals in the drawings denote like elements, and thus their description will be omitted. If it is determined that a detailed description of commonly-used technologies or structures related to the exemplary embodiments may unnecessarily obscure the subject matter, the detailed description will be omitted herefrom. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

An exemplary embodiment of a 3D display device in will now be described with reference to accompanying drawings.

Figure 1:
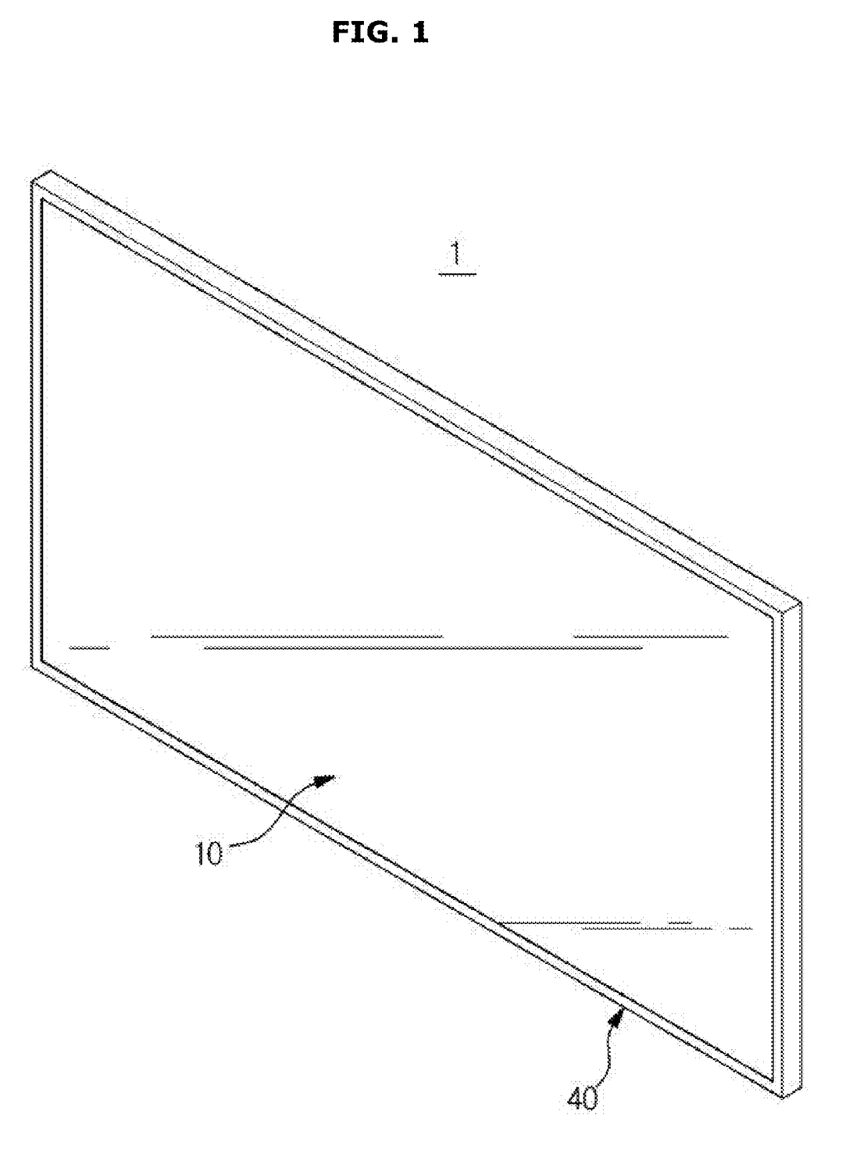
FIG. 1 is a perspective view of a three dimensional (3D) display device, according to an exemplary embodiment.
Figure 2:
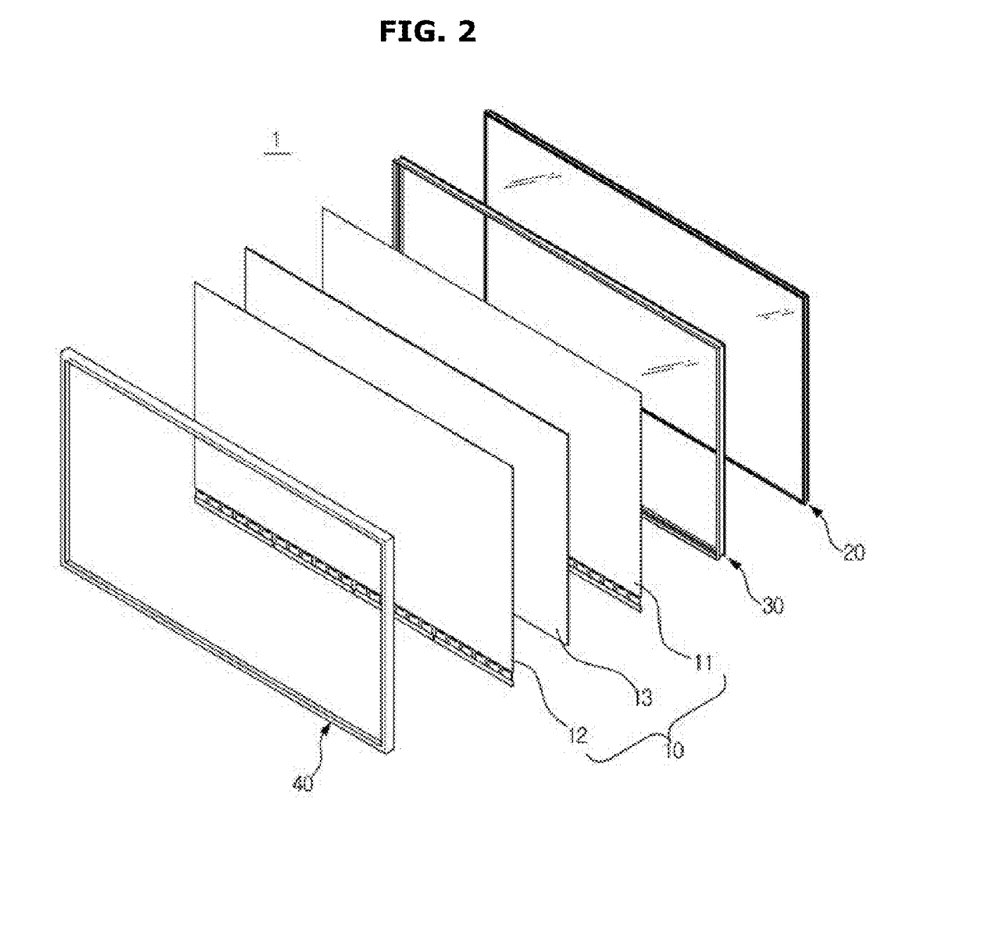
FIG. 2 is an exploded view of a 3D display device, according to an exemplary embodiment.

Referring to FIGS. 1 and 2, a 3D display device 1 may include a 3D display module 10 for displaying a 3D image, a back light module 20 arranged behind the 3D display module 10 for supplying light to the 3D display module 10, a main frame 30 for receiving and supporting the 3D display module 10 and the back light module 20, and a case 40 mounted on the main frame 30 to form an exterior of the 3D display device 1.

Figure 3:
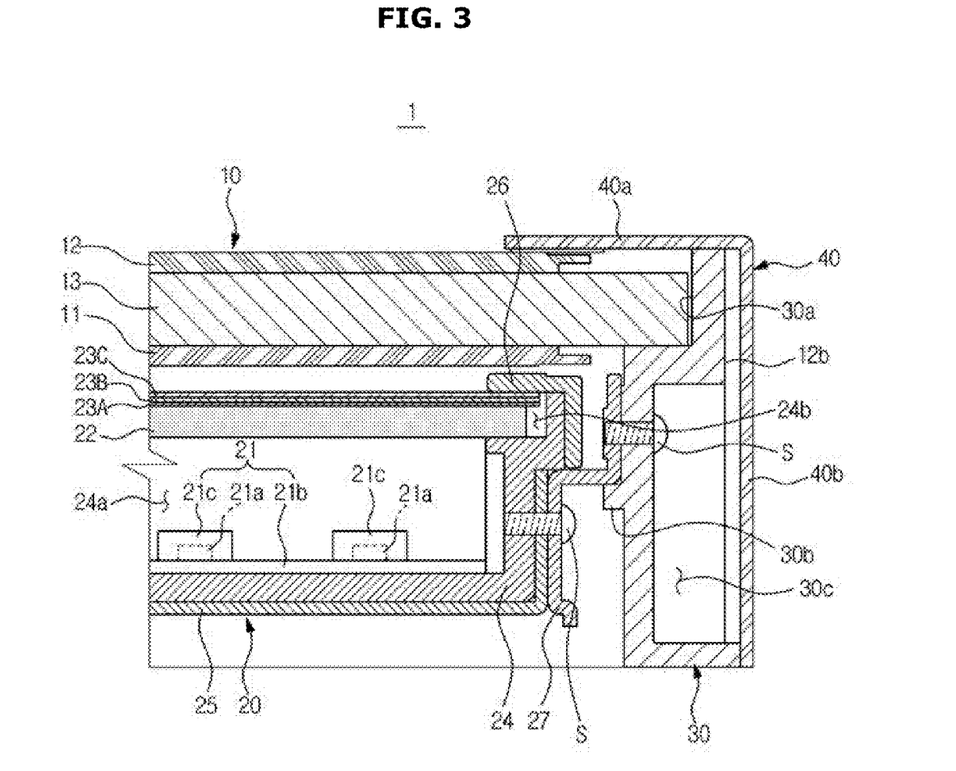
FIG. 3 is a cross-sectional view of a 3D display device, according to an exemplary embodiment.

The 3D display module 10, as shown in FIG. 3, may include a first display panel 11 for displaying a two dimensional (2D) image, a second display panel 12 separated from and placed in front of the first display panel 11 for forming a 3D image together with the first display panel 11, and a spacing panel 13 arranged between the first and second display panels 11 and 12 for keeping them separated from each other.

When the first display panel 11 displays a first image and the second display panel 12 displays a second image with a different angle of view from that of the first image, a user may perceive a 3D image by viewing the first and second images at the same time.

The first and second display panels 11 and 12 are each formed of a liquid crystal panel of a flat rectangular shape in a size corresponding to each other, and the spacing panel 13 is formed of a transparent rectangular plate having a certain thickness. The spacing panel transmits light therethrough.

The first display panel 11 is affixed to the rear side of the spacing panel 13 while the second display panel 12 is affixed to the front side of the spacing panel 13. The first and second display panels 11 and 12 are attached to the spacing panel with any of various optical bonding materials to prevent optical attenuation at the boundary between the spacing panel 13 and the first display panel 11 and at the boundary between the spacing panel 13 and the second display panel 12.

As discussed above, since the 3D display module 10 is comprised of the spacing panel 13, and the first and second display panels 11 and 12 affixed to either side of the spacing panel 13, it may be thicker than a conventional display module that includes only a single display panel.

Having the first and second display panels 11 and 12 affixed to either side of the spacing panel 13 means that the spacing panel 13 maintains a constant distance between the first and second display panels 11 and 12, providing a constant difference in the angles of view of the first and second images, thereby enabling the user to view an accurate 3D image.

The spacing panel 13 is formed to have greater vertical and horizontal widths than those of each of the first and second display panels 11 and 12, such that its outer edges extend from between the first and second display panels 11 and 12.

As shown in FIG. 3, the back light module 20 may include a light source 21 for generating light, a diffuser plate 22, arranged in front of the light source 21, for diffusing light, a plurality of optical sheets 23A, 23B, and 23C arranged in front of the diffuser plate 22, a back light frame 24 for supporting the light source 21 and the diffuser plate 22, a rear chassis 25 installed behind the back light frame 24, a supporting bracket 26 installed on the front edge of the back light frame 24 for holding the diffuser plate 22 and the plurality of optical sheets 23A, 23B, and 23C installed upon the back light frame 24, and an installation bracket 27 installed on the outer side of the rear chassis 25 for allowing the back light module 20 to be installed on the main frame 30.

The light source 21 may include a plurality of light emitting diodes (LEDs) 21, a substrate 21b on which the LEDs 21 are mounted, and lenses 21c for dispersing light emitted from the LEDs 21. The LEDs 21, lenses 21c, and substrate 21b may be installed behind the diffuser plate 22 to face the diffuser plate 22.

The diffuser plate 22 is formed of a transparent plate with a certain thickness and serves to diffuse light generated by the light source 21.

The plurality of optical sheets 23A, 23B, and 23C may include a diffusive sheet 23A for further diffusing the light transmitted through the diffuser plate 22, a prism sheet 23B that includes a prism pattern for enabling the light diffused by the diffusive sheet 23A to be focused in a direction perpendicular to the 3D display module 10, and a protective sheet 23C arranged in front of the prism sheet 23B for protecting the scratch-sensitive prism sheet 23B against dust or other substance.

The back light frame 24 may include a light source receptacle 24a within which the light source 21 and a diffuser plate receptacle 24b may be arranged behind the diffuser plate 22.

The rear chassis 25 may be formed of a metal for purposes of heat radiation and may be installed behind the back light frame 24 to cover the outer side of the light source receptacle 24a.

The supporting bracket 26 has an L-shaped cross section and is installed on the front edge of the back light frame 24 to support the diffuser plate 22 and the outer edges of the optical sheets 23A, 23B, and 23C mounted on the diffuser plate 22, thereby holding them inside the diffuser plate receptacle 24b.

The installation bracket 27 is secured to the outer side of the rear chassis 25 and has a stepped form to support a projecting part 30b of the main frame 30 as will be described below. The installation bracket 27 is secured to the rear chassis 25 and the main frame 30 with fastening members S, such as screws, to enable the back light module 20 to be secured to the main frame 30.

The main frame 30 has a substantially rectangular shape, as viewed from the front, so that it loops around the outer edges of the display module 10 and the backlight module 20. The back light module 20 is installed within the rear side of the main frame 30, and the display module 10 is installed within the front side of the main frame 30.

Figure 4:
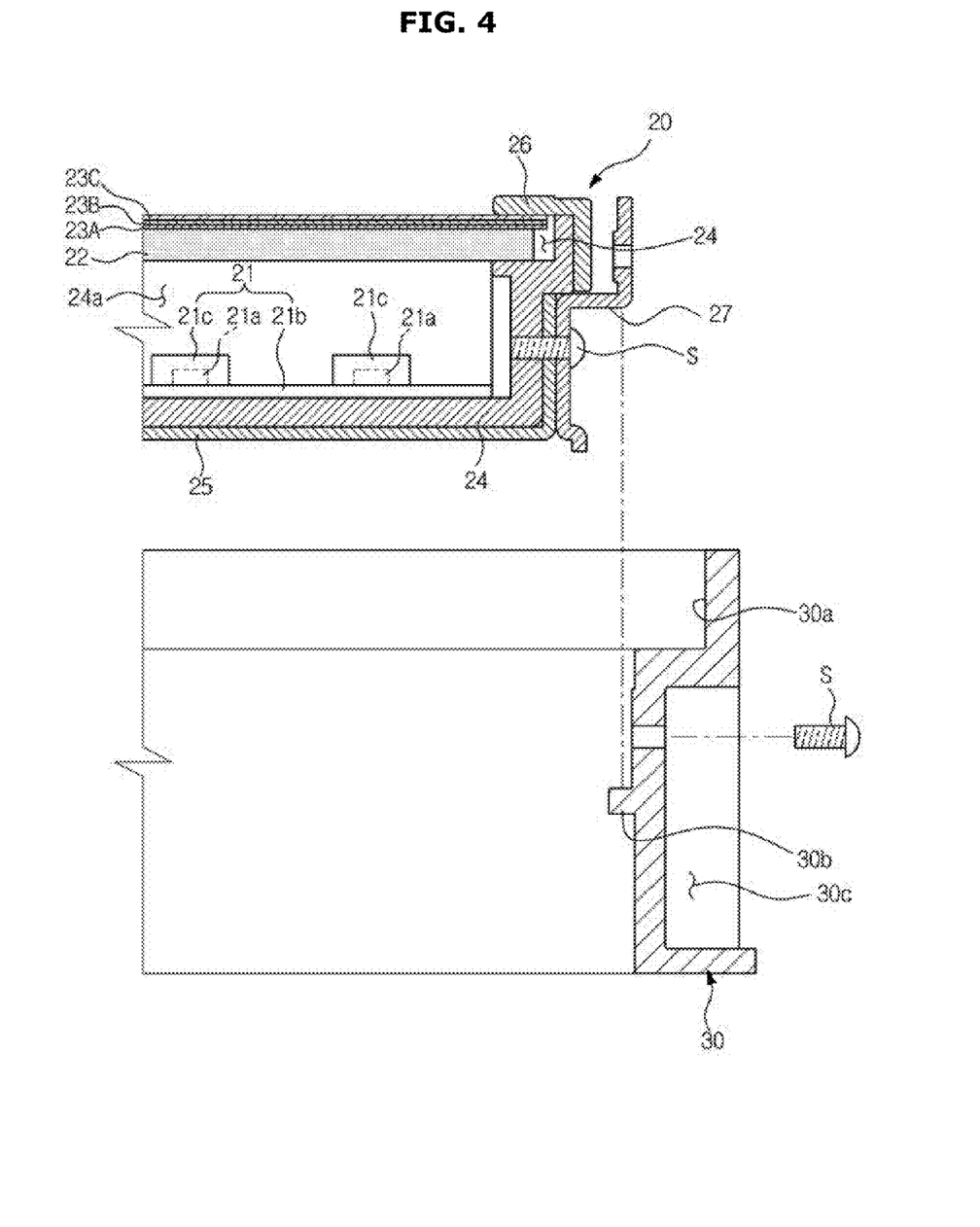
FIGS. 4 to 6 are cross-sectional views sequentially illustrating a manufacturing process for a 3D display device, according to an exemplary embodiment.
Figure 5:
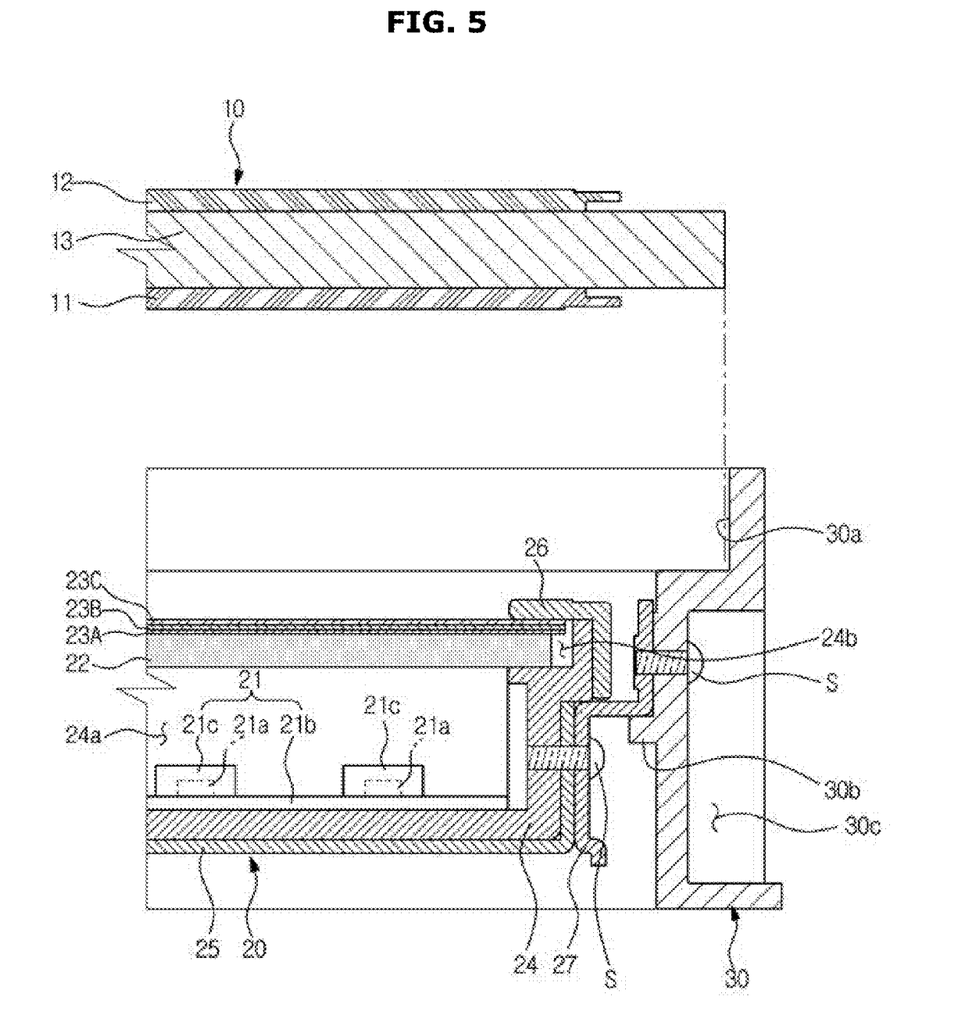

For this, the main frame 30 has a receiving groove 30a concavely formed inside of the front side of the main frame 30 to securely receive the outer edges of the spacing panel 13, and a projecting part 30b formed inside of the rear side of the main frame 30 to catch and support the installation bracket 27, as shown in FIGS. 4 and 5. Accordingly, the back light module 20 can be installed and supported inside of the rear side of the main frame 30 using the installation bracket 27 and the projecting part 30b, and the 3D display module 10 can be installed and supported inside of the front side of the main frame 30 using the receiving groove 30a.

As described above, the outer edges of the spacing panel extending from between the first and second display panels 11 and 12 are securely held in the receiving groove 30a of the main frame 30 in a manner that any force or pressure is not applied to the first display panel 11 or the second display panel 12, thereby preventing deformation of the first and second display panels 11 and 12 and any resultant image distortion.

This structure, in which the back light module 20 and the 3D display module 10 may be arranged one behind another by means of the main frame 30, enables a back light module 20, otherwise used in general display devices, to be installed behind the display module 10 without modification. This means that the back light module 20 may be common to both general display devices and the 3D display device 1.

The case 40 may have a substantially rectangular shape, as viewed from the front, so that it loops around the outer edges of the main frame 30, and may have an L-shaped cross section, constituting outer front edges and top, bottom, left, and right sides of the 3D display device 1. The case 40 may include a bezel part 40a to cover the outer edges of the second display panel 12, a side part 40b to cover the top, bottom, left, and right sides of the main frame 30, and may be secured to the main frame 30 by means of the fastening members S, such as screws.

An exemplary embodiment of a manufacturing method of the 3D display device will now be described with reference to accompanying drawings.

A 3D display module, the back light module 20, the main frame 30, and the case 40 are prepared and/or provided separately.

The 3D display module 10 may be prepared by attaching the first display panel 11 to the rear side of the spacing panel 13 and the second display panel 12 to the front side of the spacing panel 13.

The back light module 20 is installed inside of the rear side of the main frame 30 as shown in FIGS. 4 and 5.

The back light module 20 may be installed by inserting the back light module 20 into the inside of the main frame 30 such that the installation bracket 27, installed on the outer side of the back light module 20, may be caught and supported by the projecting part 30b arranged inside of the rear side of the main frame 30, and fastening the installation bracket 27 to the main frame 30 with the fastening members S, such as screws.

Figure 6:
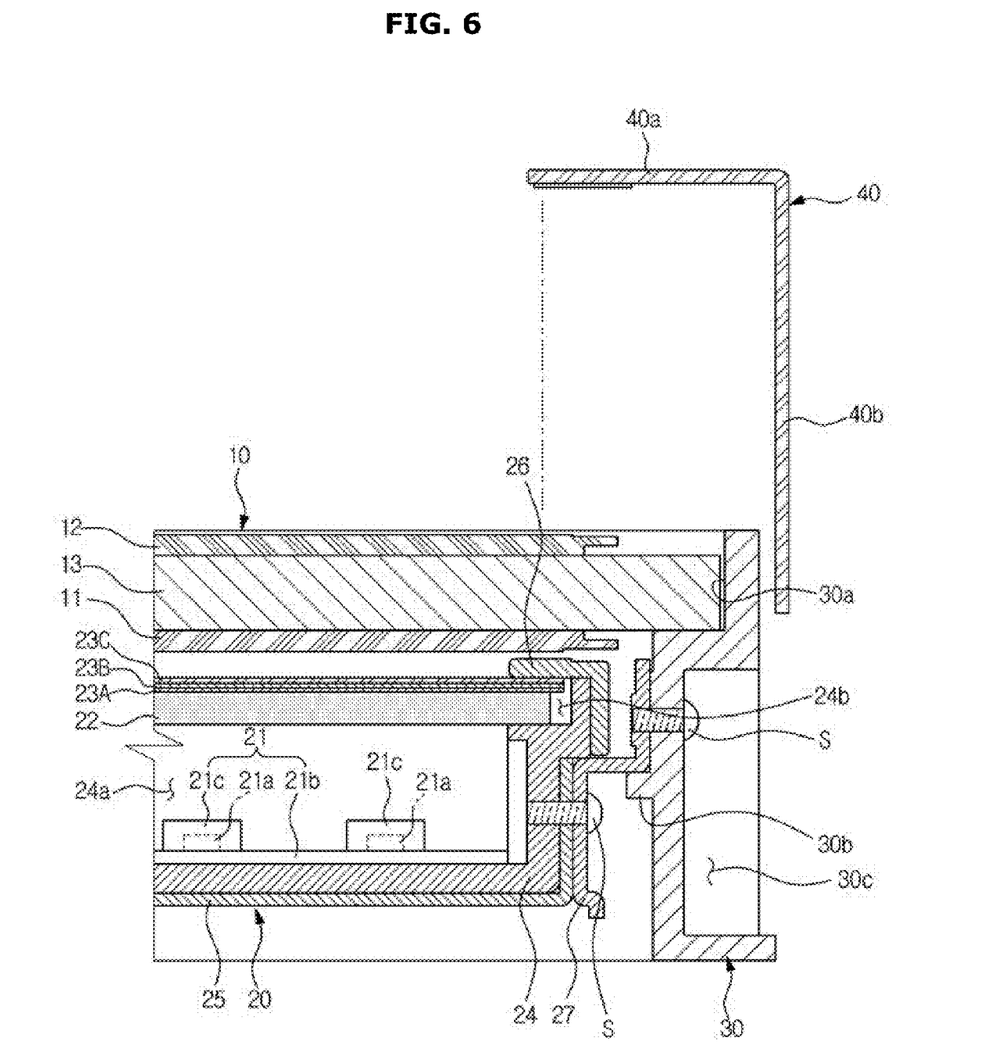

The 3D display module 10 is installed on the main frame 30 with the back light module 20 installed, as shown in FIGS. 5 and 6.

The 3D display module 10 may be installed by having the outer edges of the spacing panel 13, extending from between the first and second display panels 11 and 12, securely received and supported by the receiving groove 30b arranged inside of the front side of the main frame 30.

After completion of the installation of the 3D display module 10, the case 40 is installed on the main frame 30 such that the bezel part 40a of the case 40 covers the outer edges of the 3D display module 10 and the side part 40b of the case 40 covers the sides of the main frame 30.

In this way, a commonly used back light module may be installed behind a 3D display module by means of a main frame, and thus applied to and used by a 3D display device.

Several exemplary embodiments have been described, but a person of ordinary skill in the art will understand and appreciate that various modifications can be made without departing the scope of the present disclosure. Thus, it will be apparent to those ordinary skilled in the art that the disclosure is not limited to the embodiments described, which have been provided only for illustrative purposes.

What is claimed is:

1. A three dimensional (3D) display device comprising:
    a main frame;
    a back light module disposed inside of a rear side of the main frame; and
    a 3D display module disposed in front of the back light module within a front side of the main frame,
    wherein the 3D display module comprises:
        a first display panel configured to display a two dimensional (2D) image,
        a second display panel, disposed apart from and in front of the first display panel, the second display panel configured to display a 3D image, and
        a spacing panel, wherein the first display panel is affixed to a rear side of the spacing panel and the second display panel is affixed to a front side of the spacing panel.

2. The 3D display device of claim 1, wherein the back light module comprises:
    a light source,
    a diffuser plate disposed in front of the light source,
    a back light frame which supports the light source and the diffuser plate,
    a supporting bracket, attached to the back light frame, which is configured to support outer edges of the diffuser plate and to hold the diffuser plate to on the back light frame, and
    a rear chassis which covers the rear side of the back light frame.

3. The 3D display device of claim 1, wherein the main frame is substantially rectangular, as viewed from a front side, such that it surrounds outer edges of the back light module and the display module.

4. The 3D display device of claim 3, wherein the main frame comprises:
    a projecting part that extends inward from an inside surface of a rear side edge of the main frame and is configured to support the back light module, and
    a receiving groove, formed in an inside surface of a front side edge of the main frame, and configured to receive and support outer edges of the 3D display module.

5. The 3D display device of claim 4, wherein the spacing panel is larger, as viewed from a front side, than the first display panel and the second display panel, such that outer edges of the spacing panel extend from between the first display panel and the second display panel and extended outer edges of the spacing panel are disposed within the receiving groove.

6. The 3D display device of claim 4, wherein the back light module comprises an installation bracket disposed on the outer side of the back light module and supported by the projecting part.

7. The 3D display device of claim 1, further comprising: a case disposed around at least a portion of the main frame, the case forming an exterior of the 3D display device,
    wherein the case comprises a bezel part configured to cover an outer side of the 3D display module and a side part configured to cover sides of the main frame.

8. A manufacturing method for a three dimensional (3D) display device, the method comprising:
    providing a 3D display module, a back light module, a main frame, and a case;
    installing the back light module within an inside of a rear side of the main frame;
    installing the 3D display module within an inside of a front side of the main frame; and
    installing the case around the main frame, wherein the providing the 3D display module comprises:
providing a first display panel, a spacing panel, and a second display panel, wherein the first display panel is affixed to a rear side of the spacing panel and the second display panel is affixed to a front side of the spacing panel, and the second display panel is disposed apart from and in front of the first display panel.

9. The method of claim 8, wherein the back light module comprises an installation bracket disposed on an outer side of the back light module, and the installing the back light module comprises inserting the back light module into the main frame until the installation bracket abuts against a projecting part projecting inward from an inside of a rear side of the main frame.

10. The method of claim 8, wherein installing the 3D display module comprises: inserting the 3D display module into the main frame until outer edges of the spacing panel abut against a receiving groove formed inside of a front side of the main frame.

11. A method of assembling a three dimensional (3D) display device, the method comprising:
providing a main frame, a backlight module, a 3D display module, and a case, wherein the main frame comprises a projecting part projecting inward from an inside surface of a rear side of the main frame and a receiving groove formed inside a front side of the main frame and the backlight module comprises a backlight and an installation bracket extending outward from the backlight;
inserting the backlight module into the main frame until the installation bracket abuts against the projecting part;
inserting the 3D display module into the main frame until outer edges of the 3D display module abut against the receiving groove; and
installing the case such that a side part of the case surrounds a side part of the main frame and a bezel part of the case covers outer edges of a front surface of the 3D display module.

* * * * *